(12) United States Patent
Fujiwaka

(10) Patent No.: US 8,872,728 B2
(45) Date of Patent: Oct. 28, 2014

(54) TERMINAL DEVICE AND ILLUMINATION CONTROL METHOD

(75) Inventor: Masaya Fujiwaka, Minato-ku (JP)

(73) Assignee: NEC Corporation, Tokyo (JP)

( * ) Notice: Subject to any disclaimer, the term of this patent is extended or adjusted under 35 U.S.C. 154(b) by 93 days.

(21) Appl. No.: 13/574,192

(22) PCT Filed: Feb. 2, 2011

(86) PCT No.: PCT/JP2011/052138
§ 371 (c)(1),
(2), (4) Date: Jul. 19, 2012

(87) PCT Pub. No.: WO2011/102222
PCT Pub. Date: Aug. 25, 2011

(65) Prior Publication Data
US 2012/0299980 A1 Nov. 29, 2012

(30) Foreign Application Priority Data
Feb. 18, 2010 (JP) ................................. 2010-033583

(51) Int. Cl.
| | | |
|---|---|---|
| G09G 5/00 | (2006.01) | |
| G06F 3/14 | (2006.01) | |
| H04W 52/02 | (2009.01) | |
| G06F 1/32 | (2006.01) | |
| H04M 1/22 | (2006.01) | |
| H05B 37/02 | (2006.01) | |

(52) U.S. Cl.
CPC ........ *G06F 3/1431* (2013.01); *G09G 2330/021* (2013.01); *H04W 52/027* (2013.01); *G09G 2330/023* (2013.01); *Y02B 60/50* (2013.01); *H04M 1/22* (2013.01); *G09G 2320/0626* (2013.01); *G06F 1/3265* (2013.01); *H05B 37/0227* (2013.01); *Y02B 60/1242* (2013.01); *G09G 2330/022* (2013.01); *G09G 2320/062* (2013.01)
USPC .......................................... 345/1.1; 345/102

(58) Field of Classification Search
None
See application file for complete search history.

(56) References Cited

U.S. PATENT DOCUMENTS 6,509,911 B1    1/2003   Shimotono
7,051,287 B1 *  5/2006   Tsunoda ........................ 715/778
(Continued)

FOREIGN PATENT DOCUMENTS

| CN | 101432796 A | 5/2009 |
|---|---|---|
| JP | 03-253816 A | 11/1991 |

(Continued)

OTHER PUBLICATIONS

Extended European Search Report dated Jul. 15, 2013 issued by the European Patent Office in counterpart European Application No. 11744510.6.

(Continued)

*Primary Examiner* — Adam R Giesy
(74) *Attorney, Agent, or Firm* — Sughrue Mion, PLLC

(57) ABSTRACT

A terminal device is provided that includes screens and solves a problem in that power is consumed more than necessary. When a prescribed operation is performed on operation section 104, controller 105 causes LCD controller 103 to illuminate at least one of LCDs 101 and 102 at a first brightness levels. Subsequently, a selection operation of selecting any one of LCDs 101 and 102 is performed on operation section 104. When the selected LCD is illuminated at the first brightness levels, controller 105 causes LCD controller 103 to illuminate the LCD selected by the selection operation at a second brightness levels higher than the first brightness levels.

12 Claims, 4 Drawing Sheets

(56) References Cited

U.S. PATENT DOCUMENTS

| | | |
|---|---|---|
| 2006/0238531 A1 | 10/2006 | Wang |
| 2008/0218535 A1 | 9/2008 | Forstall et al. |
| 2010/0060572 A1* | 3/2010 | Tsern .......................... 345/157 |
| 2010/0302194 A1* | 12/2010 | Park et al. ..................... 345/173 |

FOREIGN PATENT DOCUMENTS

| | | |
|---|---|---|
| JP | 2001-265479 A | 9/2001 |
| JP | 2001-350549 A | 12/2001 |
| JP | 3253816 B2 | 2/2002 |
| JP | 2003-302957 A | 10/2003 |
| JP | 2009-049512 A | 3/2009 |
| JP | 2009-251273 A | 10/2009 |

OTHER PUBLICATIONS

Office Action, dated Jun. 4, 2014, issued by the State Intellectual Property Office of the People's Republic of China, in counterpart Application No. 201180006967.5.

* cited by examiner

TERMINAL DEVICE AND ILLUMINATION CONTROL METHOD

CROSS REFERENCE TO RELATED APPLICATION

This application is a National Stage of International Application No. PCT/JP2011/052138 filed Feb. 2, 2011, claiming priority based on Japanese Patent Application No. 2010-033583 filed Feb. 18, 2010, the contents of all of which are incorporated herein by reference in their entirety.

TECHNICAL FIELD

The present invention relates to a terminal device, that allows the brightness of a display screen to be controlled, and to an illumination control method.

BACKGROUND ART

A typical terminal device is designed such that the display screen backlight can be turned off when the device is not in use for a long period of time, thereby reducing power consumption. When a user operates the terminal device after the backlight is turned off, the backlight is turned on, allowing the user to check information displayed on the display screen and to use an application.

One of the lighting techniques pertaining to methods of lighting a backlight involves a screen display processing device described in Patent Literature 1. The screen display processing device includes two housings attached to each other in a manner capable of opening and closing. When the angle of opening of the two housings is small, the image display processing device reduces the amount of light of the backlight. When the angle of opening is large, the device increases the amount of light.

Accordingly, reducing the opening angle of the housings when a user checks an application and increasing the angle of the housings when the user uses the application can reduce illumination that is brighter than necessary on the display screen, which can, in turn, reduce the power consumption.

CITATION LIST

Patent Literature

Patent Literature 1: JP2009-49512A

SUMMARY

Technical Problem

When using an application, a user typically watches a display screen on which the application is displayed for a long period of time. Accordingly, unless the display screen shows a certain degree of brightness, the user may feel that application will be difficult to use. In contrast, when simply checking displayed information, the user may not need to watch the display screen for a long period of time. Accordingly, the display screen can be darker than that in the case of using the application.

If the display screen is illuminated at a brightness level that is suitable for using an application when the user operates an operation section in order to check the displayed information, the display screen may be illuminated brighter than is necessary, thus causing a problem in which a large amount of power is.

Terminal device having a plurality of display screens are well known. In such a terminal device, information that is displayed on one screen may be different from information that is displayed on respective display screens. Accordingly, if the backlight is turned off, the user may not recognize which information is displayed on which display screen. In this case, to use the application, the user may check information displayed on each display screen and then identify the display screen that displays the information generated by the application to be used. The user then uses the application while watching the identified display screen.

If the technique described in Patent Literature 1 is applied to a terminal device that has a plurality of display screens, all the display screens are illuminated at the brightness level that is suitable for using the application when the opening angle of the housings is increased in using the application. Thus, the display screens other than one that the user watches to use the application are brighter than necessary, which causes a problem in which a large amount of power is consumed.

It is an object of the present invention to provide a terminal device and an illumination control method that solve at least one of the problems.

Solution to Problem

A terminal device according to the present invention includes: a plurality of displays; an illumination section that is capable of separately illuminating the displays; an operation section; and a controller that, when a prescribed operation is performed on the operation section, causes the illumination section to illuminate at least one of the displays at a first brightness, and, when a selection operation of selecting any one of the displays is subsequently performed on the operation section while the display selected by the selection operation is illuminated at the first brightness level, causes the illumination section to illuminate the display selected by the selection operation at a second brightness level that is higher than the first brightness level.

An illumination control method of the present invention in a terminal device including a plurality of displays, an illumination section that is capable of separately illuminating the displays, and an operation section, the method including: causing the illumination section to illuminate at least one of the displays at a first brightness level when a prescribed operation is performed on the operation section; and causing the illumination section to illuminate the display selected by a selection operation of selecting any one of the displays at a second brightness level that is higher than the first brightness level when the selection operation is performed on the operation section while the display selected by the selection operation is illuminated at the first brightness level.

Advantageous Effects of Invention

According to the present invention, in a terminal device that includes screens, power consumption can be reduced.

DESCRIPTION OF EMBODIMENTS

Exemplary embodiments of the present invention will now be described with reference to drawings. In the following description, components including the same functions are provided with identical characters, and the description thereof may be omitted.

Figure 1:
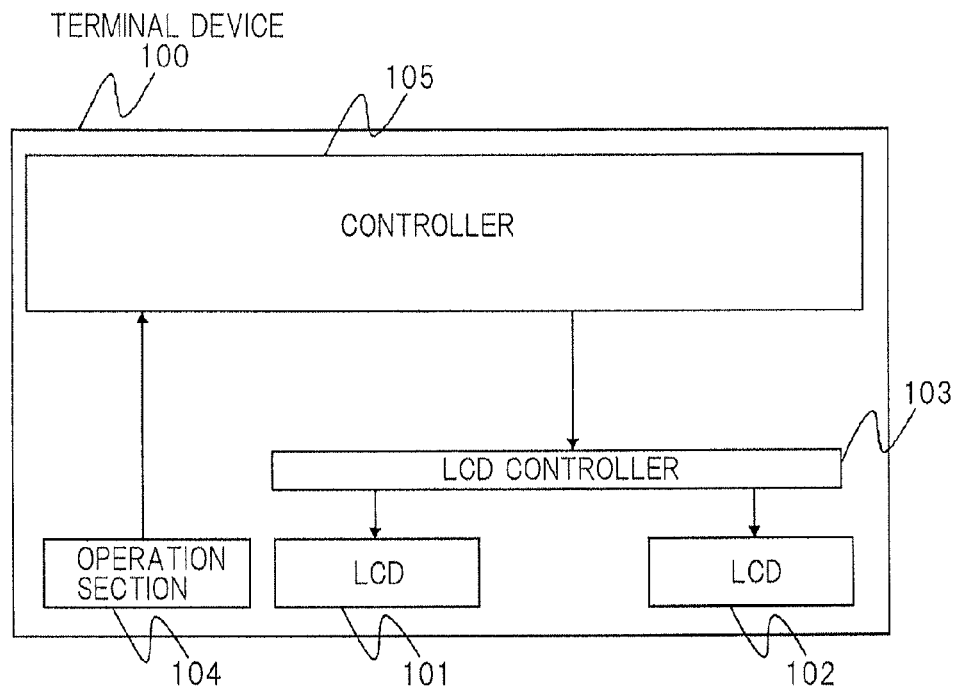
FIG. 1 is a block diagram showing a configuration of a terminal device of a first exemplary embodiment of the present invention.

FIG. 1 is a block diagram showing a configuration of a terminal device of a first exemplary embodiment of the present invention. In FIG. 1, the terminal device 100 includes LCDs (liquid crystal displays) 101 and 102, LCD controller 103, operation section 104 and controller 105.

LCDs 101 and 102 are also referred to as displays. Only two LCDs are shown in FIG. 1, although two or more LCDs may actually be provided.

LCD controller 103 is also referred to as an illumination section. For instance, LCD controller 103 includes a light source, such as a backlight, and uses the light source to separately illuminate LCDs 101 and 102.

Operation section 104 is operated by a user of the terminal device. Operation section 104 is, for instance, a hardware key.

Controller 105 controls LCD controller 103 to adjust the brightness of LCDs 101 and 102.

For instance, when a prescribed operation is performed on operation section 104, controller 105 causes LCD controller 103 to illuminate at one or more LCDs from among LCD 101 and 102 at a first brightness level.

The prescribed operations include a first prescribed operation for selecting all LCDs 101 and 102, and a second prescribed operation for selecting LCDs 101 or 102. When the first prescribed operation is performed, LCD controller 103 illuminates all LCDs 101 and 102 at the first brightness. When the second prescribed operation is performed, LCD controller 103 illuminates only the LCD selected by the second prescribed operation at the first brightness.

Subsequently, a selection operation for selecting LCDs 101 or 102 is performed on operation section 104. When the LCD selected by the selection operation has been illuminated at the first brightness level, controller 105 causes LCD controller 103 to illuminate the LCD selected by the selection operation at a second brightness level.

Here, the first brightness level is a certain brightness level at which information displayed on LCDs 101 and 102 can be recognized. The second brightness level is suitable for using an application that generates information displayed on LCDs 101 and 102, and is brighter than the first brightness level.

In the state where the LCD is illuminated, controller 105 may cause LCD controller 103 to turn off the illumination after a prescribed time elapses, regardless of whether the LCD is illuminated at the first brightness level or at the second brightness level. At this time, in the case where the LCD is illuminated at the first brightness level, it is only requirement is that the user can recognize the information displayed on the LCD. Accordingly, the time at which the LCD is illuminated at the first brightness level may be shorter than the time in which the LCD is illuminated at the second brightness level.

In the case where the terminal device 100 is operated by power accumulated in a battery, controller 105 may perform the process only when the power accumulated in the battery is less than a predetermined threshold. When the power accumulated in the battery is not less than the threshold, the prescribed operation may instruct controller 105 to cause LCD controller 103 to illuminate both LCDs 101 and 102 at the second brightness level.

Next, an operation will be described.

Figure 2:
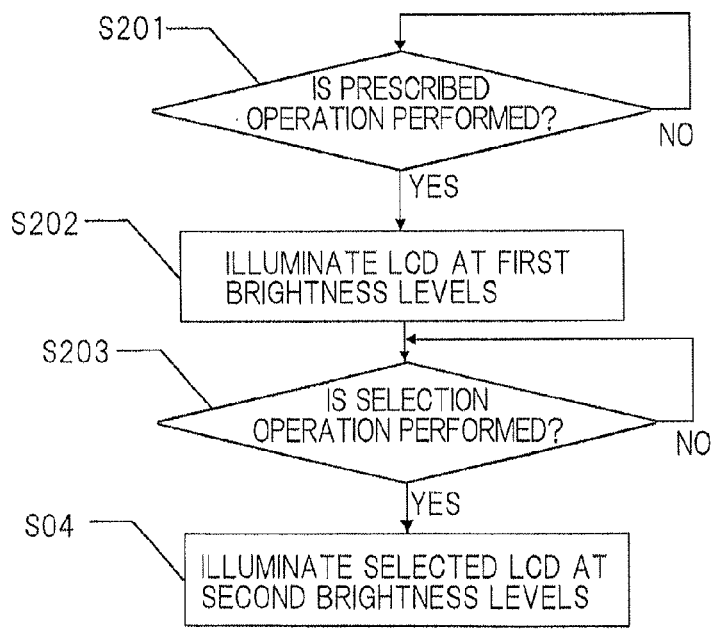
FIG. 2 is a flowchart for illustrating an example of an operation of the terminal device of the first exemplary embodiment of the present invention.

FIG. 2 is a flowchart for illustrating an example of the operation of the terminal device of this exemplary embodiment. It is assumed that, in an initial state, LCD controller 103 maintains the illumination in LCDs 101 and 102 in the off-state.

In step S201, controller 105 monitors an operation by the user on operation section 104, and verifies whether or not the prescribed operation is performed on operation section 104. If the prescribed operation is not performed, controller 105 executes step S201. If the prescribed operation is performed controller 105 executes step S202.

In step S202, controller 105 causes LCD controller 103 to illuminate at least one of LCDs 101 and 102 at the first brightness level. Subsequently, controller 105 executes step S203.

In step S203, controller 105 monitors an operation by the user on operation section 104, and verifies whether the selection operation is performed on operation section 104 or not. If the selection operation is performed, controller 105 executes step S204. If the selection operation is not performed, controller 105 executes step S203.

In step S204, if the LCD selected by the selection operation is already illuminated at the first brightness level, controller 105 causes LCD controller 103 to illuminate this LCD at the second brightness level.

If the selection operation selects both the LCDs illuminated at the first brightness level, controller 105 will illuminate both the LCDs at the second brightness level.

According to this exemplary embodiment, when the prescribed operation is performed on operation section 104, controller 105 causes LCD controller 103 to illuminate one or more LCDs from among LCD 101 and 102 at the first brightness level. Subsequently, the selection operation for selecting either LCD 101 or 102 is performed on operation section 104. If the selected LCD has been illuminated at the first brightness level, controller 105 will cause LCD controller 103 to illuminate the LCD selected by the selection operation at the second brightness level that is higher than the first brightness level.

In this case, if the prescribed operation is performed, one or more LCDs from among LCD 101 and 102 is/are illuminated at the first brightness level. Subsequently, if the LCD selected by the selection operation has been illuminated at the first brightness level, this LCD will illuminated at the second brightness level that is higher than the first brightness level.

In this way, it is possible to reduce the brightness level of the LCD, other than the LCD that is used for viewing the application, at or below the first brightness level when the user checks the application that is displayed on the LCD at the first brightness level and performs a selection operation to select the LCD that will be used for viewing the application. Accordingly, appropriate adjustment of the first and second brightness levels can prevent the LCD, other than the LCD that is being used to view the application, from being brighter than is necessary. This allows power consumption saving.

Next, a second exemplary embodiment will be described.

Figure 3:
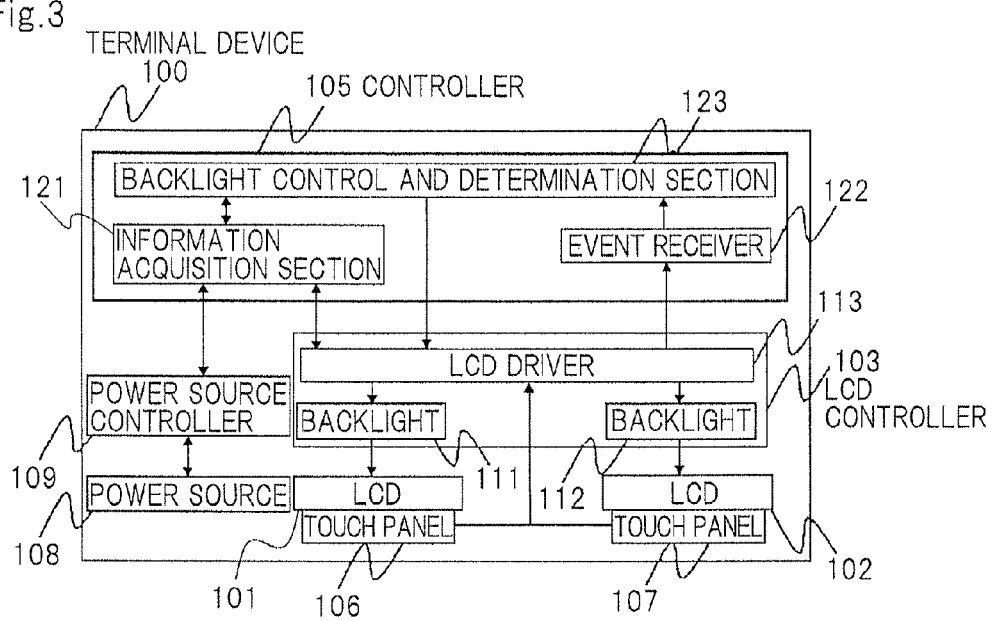
FIG. 3 is a block diagram showing a configuration of a terminal device of a second exemplary embodiment of the present invention.

FIG. 3 is a block diagram showing a configuration of a terminal device of this exemplary embodiment. In FIG. 3, terminal device 100 includes LCDs 101 and 102, LCD controller 103, controller 105, touch panels 106 and 107, power source 108 and power source controller 109.

LCD controller 103 includes backlights 111 and 112, and LCD driver 113.

Backlights 111 and 112 are light sources for illuminating LCDs 101 and 102. It is hereinafter assumed that backlight 111 illuminates LCD 101 and backlight 112 illuminate LCD 102.

LCD driver 113 displays an application program executed by the terminal device and information generated by an OS (operating system) and the like on LCDs 101 and 102. The LCD driver can display pieces of information that are different from each other on respective LCDs 101 and 102.

LCD driver 113 controls illumination of backlights 111 and 112 to adjust the brightness levels of LCDs 101 and 102.

In this exemplary embodiment, the first brightness level is half the second brightness level. LCD driver 113 causes each of backlights 111 and 112 to operate in any of the following states: a half lit sate in which the LCD is illuminated at the first brightness, a full lit state in which the LCD is illuminated at the second brightness, and an unlit state in which the LCD is not illuminated, thereby separately adjusting the brightness of the LCDs 101 and 102.

Every time when LCD driver 113 adjusts the brightness levels of LCDs 101 and 102, this driver generates state information representing the illumination state of LCDs 101 and 102. The illumination states are a half lit state in which illumination is at the first brightness level, and a full lit state in which illumination is at the second brightness level, and a turned off state in which illumination is turned off.

Touch panels 106 and 107 are included in operation section 104 shown in FIG. 1. Touch panels 106 and 107 are included in LCDs 101 and 102, respectively. It is hereinafter assumed that touch panel 106 is included in LCD 101 and touch panel 107 is included in LCD 102.

Touch panels 106 and 107 detect whether or not the user performs a touch operation or not. The touch operation is an operation in which touch panel 106 or 107 is touched.

When touch panels 106 and 107 detect the touch operation by the user, the touch panels transmit event information, which is a detection signal of the touch operation, to controller 105 via LCD driver 113. More specifically, the event information includes position information that indicates a contact position on touch panels 106 and 107, and identification information that indicates the touch panel on which the touch operation has been performed.

Power source 108 can accumulate power for operating terminal device 100.

Power source controller 109 controls power source 108 to supply each element of terminal device 100 with power. Power source controller 109 periodically measures remaining amount of power that has accumulated in power source 108, and generates information that represents the measured amount of power than remains.

Controller 105 controls LCD controller 103 to adjust the brightness levels of LCDs 101 and 102, on the basis of event information from touch panels 106 and 107, the remaining power measured by the power source controller 109, and state information generated by LCD driver 113.

More specifically, when controller 105 receives the event information, controller 105 determines whether or not both the illumination states of LCDs 101 and 102 indicated by the state information represent the turned off state. If both the illumination states represent the turned off state, controller 105 starts an adjustment process for adjusting the brightness levels of LCDs 101 and 102.

In the adjustment process, controller 105 verifies whether or not the prescribed operation has been performed on the basis of the event information. If the prescribed operation has been performed, controller 105 determines whether the first prescribed operation for selecting all LCDs 101 and 102 has been performed or whether the second prescribed operation for selecting either LCDs 101 or 102 has been performed as the prescribed operation, on the basis of the event information.

After the prescribed operation has been operated, if the remaining power is at least a predetermined threshold, controller 105 causes LCD controller 103 to illuminate one or more LCDs from among LCDs 101 and 102 at the second brightness. More specifically, after the first prescribed operation is performed as the prescribed operation, controller 105 causes LCD controller 103 to illuminate all LCDs 101 and 102 at the second brightness levels. If the second prescribed operation is performed as the prescribed operation, controller 105 causes LCD controller 103 to illuminate the LCD selected by the second prescribed operation at the second brightness levels.

Meanwhile, if the remaining power is less than the predetermined threshold, controller 105 causes LCD controller 103 to illuminate one or more LCDs from among LCD 101 and 102 at the first brightness. More specifically, if the first prescribed operation has been performed as the prescribed operation, controller 105 causes LCD controller 103 to illuminate both LCDs 101 and 102 at the first brightness levels. If the second prescribed operation has been performed as the prescribed operation, controller 105 causes LCD controller 103 to illuminate the LCD selected by the second prescribed operation at the first brightness levels.

When one or more LCDs from LCDs 101 and 102 is/are illuminated at the first brightness, controller 105 determines whether or not the selection operation has been performed on touch panels 106 and 107 on the basis of the event information.

In the case where the selection operation is not operated on touch panels 106 and 107 even after a prescribed time has elapsed since the prescribed operation was preformed, controller 105 causes LCD controller 103 to stop illuminating both LCDs 101 and 102.

In the case where the selection operation is performed before the prescribed time has elapsed since the selection operation was performed, controller 105 determines whether or not the LCD selected by this selection operation was illuminated at the first brightness levels.

If the selected LCD is illuminated at the first brightness levels, controller 105 causes LCD controller 103 to illuminate the LCD at the second brightness levels. In contrast, if illumination on the selected LCD has been turned off, controller 105 will cause LCD controller 103 to illuminate the LCD at the first brightness levels and to stop illuminating all LCDs other than the selected LCD.

In the above process, controller 105 performs a stop process of stopping illuminating the LCD other than the LCD selected by the selection operation. The stop process may be omitted. Illuminating the selected LCD at the first brightness levels is sufficient Controller 105 may cause LCD controller 103 to illuminate the LCD selected by the selection operation at the second brightness levels. This allows a burden on the user to be reduced.

More specifically, controller 105 includes information acquisition section 121, event receiver 122, and backlight control and determination section 123. These elements realize the following functions.

Information acquisition section 121 acquires the remaining amount information from power source controller 109, and acquires the state information from LCD driver 113.

Event receiver 122 receives the event information from touch panels 106 and 107.

The illumination states of both LCDs 101 and 102 indicated by the state information acquired by information acquisition section 121 are in the turned off state when event receiver 122 starts receiving the event information, and when backlight control and determination section 123 starts the adjustment process of adjusting the brightnesses of LCDs 101 and 102.

In the adjustment process, backlight control and determination section 123 determines whether or not the prescribed operation has been performed on touch panels 106 and 107, on the basis of the event information received by event receiver 122.

Hereinafter, it is provided that the prescribed operation is a click operation. In this case, if reception of the event information by event receiver 122 is finished without movement of the contact position indicated by the event information, backlight control and determination section 123 determines that the click operation as the prescribed operation has been performed.

At this time, if the click operation has been performed twice in a predetermined determination time, backlight control and determination section 123 determines that a double-click operation has been performed as the click operation. If the click operation has not been performed twice in the reference time, this section determines that a single-click operation has been performed as the click operation. Hereinafter, the double-click operation is regarded as a first prescribed operation, and the single-click operation is regarded as a second prescribed operation. The LCD selected by the single-click operation is the LCD that includes the touch panel on which the single-click operation has been performed.

When the click operation is performed, backlight control and determination section 123 determines whether or not the remaining power indicated by the remaining amount information acquired by information acquisition section 121 is less than a threshold.

If the remaining power is not less than the threshold, backlight control and determination section 123 controls LCD driver 113 to cause backlights 111 or 112 or backlights 111 and 112 to be in the full lit state, thereby illuminating LCD 101 or 102 or LCD 101 and 102 at the second brightness levels.

At this time, if a single-click operation is performed as the prescribed operation, backlight control and determination section 123 controls LCD driver 113 to cause only the backlight of the LCD that includes the touch panel on which the single-click operation is performed to be in the full lit state, thereby illuminating only this LCD at the second brightness levels. If the double-click operation is performed as the prescribed operation, backlight control and determination section 123 controls LCD driver 113 to cause both backlights 111 and 112 to be in the full lit state, thereby illuminating both LCDs 101 and 102 at the second brightness.

If the remaining power is less than the threshold, backlight control and determination section 123 controls LCD driver 113 to cause backlights 111 or 112 or backlights 111 and 112 to be in the full lit state, thereby illuminating LCD 101 or 102 or LCD 101 and 102 at the first brightness levels.

At this time, if the single-click operation is performed as the prescribed operation, backlight control and determination section 123 controls LCD driver 113 to cause only the backlight of the LCD including the touch panel on which the single-click operation is performed to be in the half lit state, thereby illuminating only this LCD at the first brightness levels. In contrast, the double-click operation is performed as the prescribed operation, backlight control and determination section 123 controls LCD driver 113 to cause both backlights 111 and 112 to be in the half lit sate, thereby illuminating both LCDs 101 and 102 at the first brightness levels.

When one or more LCDs from among LCD 101 and LCD 102 is/are illuminated at the first brightness levels, backlight control and determination section 123 monitors event receiver 122 and determines whether or not the selection operation is performed on touch panels 106 and 107. Hereinafter, it is provided that the selection operation is a touch operation. In this case, when event receiver 122 receives the event information, backlight control and determination section 123 determines that the selection operation will be performed. The LCD selected by the touch operation is the LCD including the touch panel on which the touch operation is performed.

If the touch operation is not performed on touch panels 106 and 107 even after the prescribed time has elapsed since the prescribed operation was executed, backlight control and determination section 123 controls LCD driver 113 to turn off backlights 111 and 112, thereby stops the entire illumination on both LCDs 101 and 102.

In the case where the touch operation is performed before the prescribed time has elapsed since the prescribed operation was executed, if the LCD that includes the touch panel on which the touch operation is performed is illuminated at the first brightness levels, backlight control and determination section 123 controls LCD driver 113 to cause only the backlight of the LCD to be in the full lit state, thereby illuminating the this LCD at the second brightness levels.

In contrast, if illumination on the LCD that includes the touch panel on which the selection operation is performed is turned off, backlight control and determination section 123 controls LCD driver 113 to cause the back light of this LCD to be in the half lit state, thereby illuminating this LCD at the first brightness levels. Backlight control and determination section 123 may illuminate this LCD at the first brightness levels, while turning off the backlight of the LCD other than this LCD, thereby stopping illumination on the LCD other than this LCD.

If the touch operation is not performed on touch panels 106 and 107 even after the prescribed time has elapsed since the selection operation, was executed backlight control and determination section 123 may control LCD driver 113 to turn off both backlights 111 and 112, thereby stopping the entire illumination on LCDs 101 and 102.

Here, when the LCD is illuminated at the second brightness level, the user watches the LCD for using the application. However, when the LCD is illuminated at the first brightness levels, the user watches the LCD to check the displayed content. When the LCD is illuminated at the first brightness, the user can sufficiently recognize the displayed content even during the a relatively short lighting time period in which the LCD is illuminated. Accordingly, the lighting time period in which the LCD is illuminated at the first brightness levels may be shorter than the lighting time period in which the LCD is illuminated at the second brightness levels. This allows power consumption due to the long lighting time to be reduced.

Next, an operation will be described.

Figure 4:
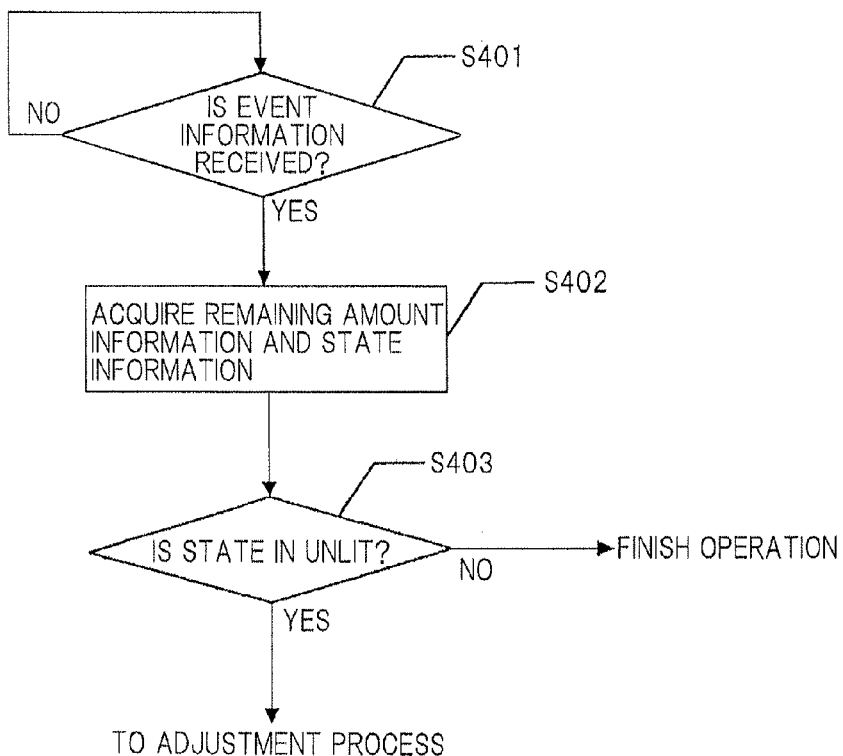
FIG. 4 is a flowchart for illustrating an example of an operation of the terminal device of the second exemplary embodiment of the present invention.

FIG. 4 is a flowchart for illustrating an operation before the terminal device starts the adjustment process.

In step S401, backlight control and determination section 123 monitors whether or not event receiver 122 receives the event information. If event receiver 122 does not receive the event information, backlight control and determination section 123 executes step S401. If event receiver 122 receives the event information, this section executes step S402.

In step S402, backlight control and determination section 123 transmits an operation instruction to information acquisition section 121. When information acquisition section 121 receives the operation instruction, this section receives the remaining amount information from power source controller 109 and receives the state information from LCD driver 113. Information acquisition section 121 transmits information that shows the amount of power that remains and the state information to backlight control and determination section 123. When backlight control and determination section 123 receives the remaining amount information and the state information, this section executes step S403.

In step S403, backlight control and determination section 123 determines whether or not both the illumination states of LCDs 101 and 102 that are indicated by the state information are in the turned off state or not. If both the illumination states are in the turned off state, backlight control and determination section 123 starts the adjustment process. If at least one of the illumination states is not in the turned off state, this section finished the process.

Figure 5:
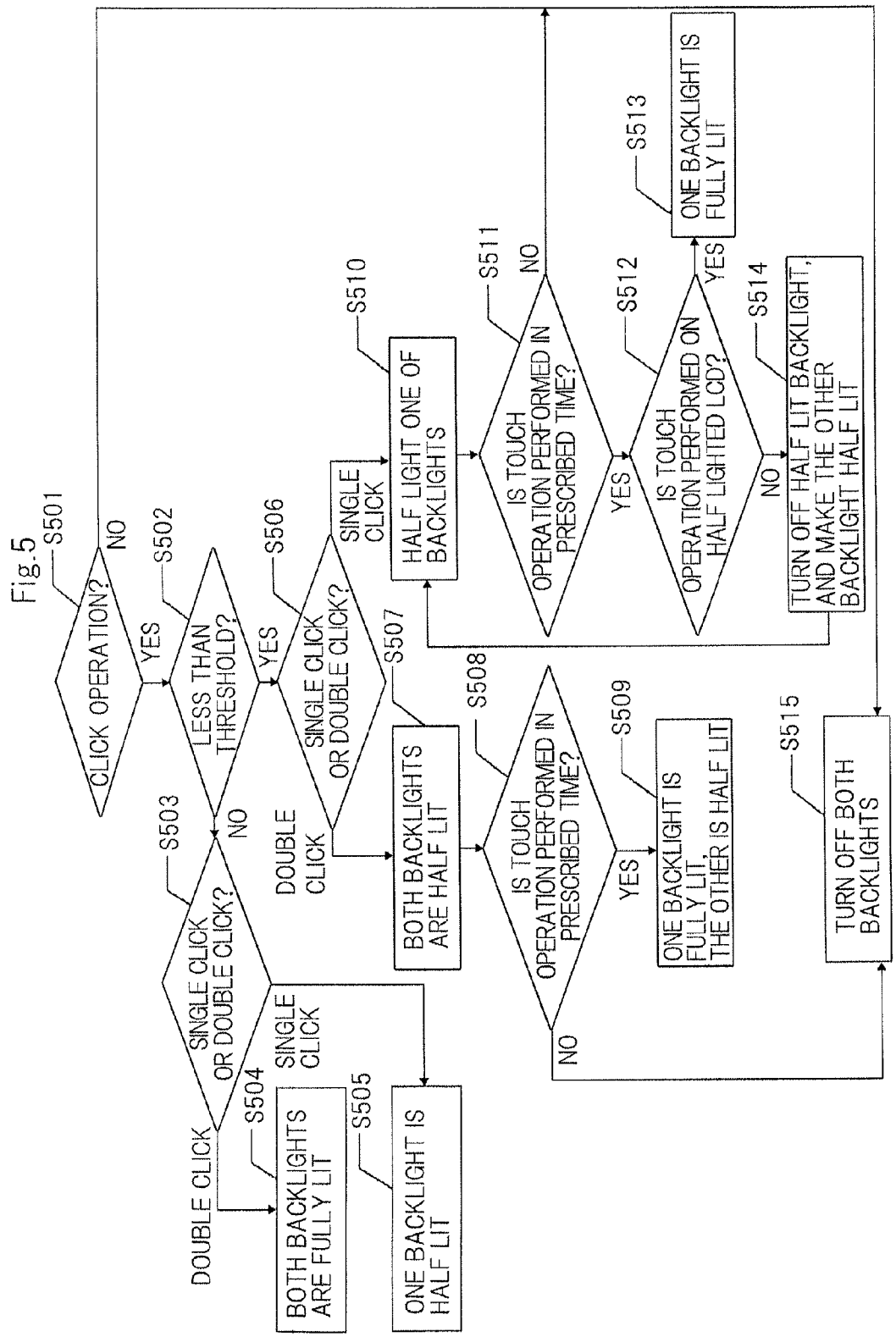
FIG. 5 is a flowchart for illustrating another example of the terminal device of the second exemplary embodiment of the present invention.

FIG. 5 is a flowchart for illustrating an example of an operation of the terminal device in the adjustment process.

In step S501, backlight control and determination section 123 determines whether or not the click operation has been operated on one or more of touch panels from among touch panel 106 and touch panel 107, on the basis of the event information received by event receiver 122 in step S401 in FIG. 4.

More specifically, backlight control and determination section 123 verifies whether or not reception of the event information is finished without movement of the contact position indicated by the event information. If the reception of the event information is finished without movement of the contact position, backlight control and determination section 123 determines that the click operation has been performed. If the contact position is moved, this section determines that the click operation has not been performed.

If the click operation is not performed, backlight control and determination section 123 executes step S515. If the click operation is performed, this section executes step S502.

In step S502, backlight control and determination section 123 determines or not whether the remaining power indicated by the remaining amount information received in step S402 in FIG. 4 is less than the threshold or not. If the remaining power is not less than the threshold, backlight control and determination section 123 executes step S503. If the remaining power is less than the threshold, this section executes step S506.

In step S503, backlight control and determination section 123 verifies whether the click operation is the single-click operation or the double-click operation. If the click operation is the double-click operation, backlight control and determination section 123 executes step S504. If the click operation is the single-click operation, this section executes step S505.

In step S504, backlight control and determination section 123 generates a first control signal and a second control signal that indicate the full lit state. The first control signal is for controlling lighting of backlight 111. The second control signal is for controlling the lighting of backlight 112.

Backlight control and determination section 123 transmits the generated first and second control signals to LCD driver 113. When LCD driver 113 receives the first and second control signals, this driver causes both backlights 111 and 112 to be in the full lit state, thereby illuminating all LCDs 101 and 102 at the second brightness level. This finishes the adjustment process.

In step S505, backlight control and determination section 123 verifies the identification information in the event information received by the event receiver 122 in step S401 in FIG. 4. Backlight control and determination section 123 generates the first control signal indicating the full lit state and the second control signal indicating the unlit state, in order to illuminate LCD 101 that includes the touch panel (hereinafter, touch panel 106) indicated by the verified identification information at the second brightness levels.

Backlight control and determination section 123 transmits the first and second control signals to LCD driver 113. When LCD driver 113 receives the first and second control signals, this driver causes backlight 111 to be in the full lit state and to turn off backlight 112, thereby illuminating only LCD 101 at the second brightness levels. This finishes the adjustment process.

In step S506, backlight control and determination section 123 verifies whether the click operation is the single-click operation or the double-click operation. If the click operation is the double-click operation, backlight control and determination section 123 executes step S507. If the click operation is the single-click operation, this section executes step S510.

In step S507, backlight control and determination section 123 generates the first and second control signals that indicate the half lit state, and transmits the first and second control signals to LCD driver 113. When LCD driver 113 receives the first and second control signals, this driver causes backlights 111 and 112 to be in the half lit state, thereby illuminating LCDs 101 and 102 at the first brightness levels. After backlight control and determination section 123 transmits the first and second control signals, this section executes step S508.

In step S508, backlight control and determination section 123 verifies whether or not event receiver 122 receives the event information in the prescribed time or not, and determines whether or not the touch operation is performed on one or more of touch panels from among touch panel 106 and touch panels 107.

When the event information is received in the prescribed time, backlight control and determination section 123 determines that the touch operation has been performed, and executes step S509. When the event information is not received in the prescribed time, this section determines that the touch operation has not been performed, and executes step 515.

In step S509, backlight control and determination section 123 verifies the identification information in the event information received by event receiver 122 in step S508. Backlight control and determination section 123 generates the first control signal indicating the full lit state, in order to illuminate LCD 101 that includes the touch panel (hereinafter, touch panel 106) indicated by the verified identification information at the second brightness levels.

Backlight control and determination section 123 transmits the first control signal to LCD driver 113. When LCD driver 113 receives the first control signal, this driver causes backlight 111 to be in the full lit state, thereby illuminating LCD 101 at the second brightness levels.

At this time, backlight control and determination section 123 may illuminate LCD 102 that includes touch panel 107 at the first brightness, or stop illuminating LCD 102.

In the case of illuminating LCD 102 at the first brightness levels, backlight control and determination section 123 generates the second signal indicating the half lit state, and transmits the second control signal to LCD driver 113. When LCD driver 113 receives the second control signal, this driver causes backlight 112 to be in the half lit state, thereby illuminating LCD 102 at the first brightness state.

When backlight control and determination section 123 stops the illumination on LCD 102, this section generates the second control signal indicating the unlit state, and transmits the second control signal to LCD driver 113. When LCD driver 113 receives the second control signal, this driver turns off backlight 112, thereby stopping illuminating LCD 102.

Backlight control and determination section 123 may transmit the second control signal indicating the unlit state to LCD driver 113, after a certain time period has elapsed since transmission of the first control signal. Backlight control and determination section 123 may transmit the second control signal indicating the unlit state to LCD driver 113, after a certain time period has elapsed since transmission of the second control signal indicating the half lit state.

In step S510, backlight control and determination section 123 verifies the identification information in the event information received by event receiver 122 in step S401 in FIG. 4. Backlight control and determination section 123 generates the first control signal indicating the half lit state, in order to illuminate LCD 101 that includes touch panel 106, which is the touch panel indicated by the verified identification information, at the first brightness levels.

Backlight control and determination section 123 transmits the first control signal to LCD driver 113. When LCD driver 113 receives the first control signal, this section causes backlight 111 to be in the half lit state, thereby illuminating only LCD 101 at the first brightness levels. After backlight control and determination section 123 transmits the first control signal, this section executes step S511.

In step S511, backlight control and determination section 123 verifies whether or not event receiver 122 receives the event information in a prescribed time, and determines whether the touch operation is performed on one or more of touch panels from among touch panel 106 and touch panel 107.

If the event information is received in the prescribed time, backlight control and determination section 123 determines that the touch operation has been performed, and executes step S512. If the event information is not received in the prescribed time, this section executes step S515.

In step S512, backlight control and determination section 123 transmits the acquisition instruction for the state information to the information acquisition section 121. When information acquisition section 121 receives the acquisition instruction, this section acquires the state information from LCD driver 113, and transmits the state information to backlight control and determination section 123. When backlight control and determination section 123 receives the state information, this section determines whether or not the LCD that includes the touch panel indicated by the identification information in the event information received in step S511 is in the half lit state, on the basis of the state information. If the LCD is in the half lit state, backlight control and determination section 123 executes step S513. If the LCD is not in the half lit state, this section executes step S514.

In step S513, backlight control and determination section 123 generates the first control signal indicating the full lit state, and the second control signal indicating the unlit state, in order to illuminate the LCD (hereinafter, LCD 101) in the half lit state at the second brightness levels.

Backlight control and determination section 123 transmits the first and second control signals to LCD driver 113. When LCD driver 113 receives the first and second control signals, this driver causes backlight 111 to be in the full lit state and turns off backlight 112, thereby illuminating LCD 101 at the second brightness levels. This finishes the adjustment process.

The timing at which illumination on LCD 102 is stopped in step S513 may be immediately after LCD 101 has been illuminated at the second brightness levels, or after a certain time period has elapsed since LCD 101 has been illuminated at the second brightness levels. Backlight control and determination section 123 may omit the process of stopping illumination on LCD 102.

In step S514, backlight control and determination section 123 generates the first control signal indicating the unlit state and the second control signal indicating the half lit state, in order to illuminate the LCD (hereinafter, LCD 102) that includes the touch panel indicated by the identification information in the event information at the first brightness levels.

Backlight control and determination section 123 transmits the first and second control signals to LCD driver 113. When LCD driver 113 receives the first and second control signals, this driver turns off backlight 111 and causes backlight 112 to be in the half lit state, thereby illuminating only LCD 102 at the first brightness levels. After backlight control and determination section 123 transmits the first and second control signals, this section executes step 510.

The timing at which illumination on LCD 101 is stopped in step S513 may be immediately after LCD 101 is illuminated at the second brightness levels, or after a certain time period has elapsed since LCD 102 having been illuminated at the second brightness levels. Backlight control and determination section 123 may omit the process of stopping illumination on LCD 101.

In step S515, backlight control and determination section 123 generates the first and second control signals indicating the unlit state, in order to turn off both LCDs 101 and 102. Backlight control and determination section 123 transmits the first and second control signals to LCD driver 113. When LCD driver 113 receives the first and second control signals, this driver turns off backlights 111 and 112, thereby turning off the entire illumination on LCDs 101 and 111. This finishes the adjustment process.

According to this exemplary embodiment, when the first prescribed operation for selecting all LCDs 101 and 102 is performed as the prescribed operation, controller 105 causes LCD controller 103 to illuminate all LCDs 101 and 102 at the first brightness levels.

In this case, when the prescribed operation is performed, all LCDs 101 and 102 are illuminated at the first brightness levels. Accordingly, the user can recognize the displayed content displayed on all LCDs 101 and 102 at one time. This allows the user to quickly recognize the application to be used.

In this exemplary embodiment, when the second prescribed operation for LCDs 101 or 102 is performed as the prescribed operation, controller 105 causes LCD controller 103 to illuminate the LCD selected by the second prescribed operation at the first brightness levels.

In this case, when the prescribed operation is performed, LCDs 101 or 102 is illuminated at the first brightness levels. Accordingly, illumination on the LCD on which displayed information that does not need to be recognized is not required. This allows the power consumption to be further reduced.

In the exemplary embodiment, the first prescribed operation is a double-click on the screen. However, the first prescribed operation is not limited thereto. Instead, various operations that controller 105 can recognize as an operation by a user are adoptable. These operations include a single-click, a double-click, a long press and a short press of a hardware keyboard, a contact operation on a touch panel, difference in locus, such as a flick operation and a drag operation, an operation of shaking the terminal, and an operation of opening the terminal.

Furthermore, various operations that controller 105 can recognize as an operation by the user are adoptable include not only the first prescribed operation but also the second prescribed operation and the selection operation.

In this exemplary embodiment, when the LCD selected by the selection operation is illuminated at the first brightness levels, controller 105 causes LCD controller 103 to illuminate the selected LCD at the second brightness levels.

In this case, only the LCD on which the user checks the displayed information can be illuminated at the second brightness levels. Accordingly, the LCD that the user does not identify is erroneously illuminated at the second brightness levels. This allows the power consumption to be further reduced.

In this exemplary embodiment, when the selection operation selects the LCDs illuminated at the first brightness levels, controller 105 illuminates all the selected LCDs at the second brightness levels.

In this case, for instance, even if certain information is displayed across the LCDs, the user can recognize the LCD illuminated at the first brightness levels, allowing all the LCDs that are displaying the information to be illuminated.

In this exemplary embodiment, if the LCD selected by the selection operation is illuminated at the first brightness levels, controller 105 causes LCD controller 103 to turn off the LCD other than the selected LCD. Controller 105 may turn off the LCD immediately after the selection operation has been executed or after a certain time period has elapsed since the selection operation was executed.

In this case, the illumination on the LCD other than the LCD on which the user checks the displayed information can be turned off. This allows the power consumption to be further reduced.

In this exemplary embodiment, if the illumination on the LCD selected by the selection operation is turned off, controller 105 causes LCD controller 103 to illuminate this LCD at the first brightness levels.

This allows the LCDs to be successively recognized.

In this exemplary embodiment, when the illumination on the LCD selected by the selection operation is turned off, controller 105 can cause LCD controller 103 to illuminate this LCD at the second brightness levels.

In this case, the illumination is performed at the second brightness levels required for operation. This allows the number of operational procedures of the user to be reduced.

In this exemplary embodiment, when the illumination on the LCD selected by the selection operation is turned off, controller 105 causes LCD controller 103 to stop illumination on the LCD other than the selected LCD.

In this case, the illumination on the LCD on which the user has completed the displayed information can be turned off. This allows the power consumption to be further reduced.

In this exemplary embodiment, the prescribed operation instructs the controller 105 to cause LCD controller 103 to illuminate one or more LCDs from among LCD 101 and LCD 102 at the first brightness levels if the remaining power measured by power source controller 109 is less than the threshold. Meanwhile, this operation instructs the controller to cause LCD controller 103 to illuminate one or more LCDs from among LCD 101 and LCD 102 at the second brightness levels if the remaining power is not less than the threshold.

This allows the power consumption saving only when the remaining power is low.

In this exemplary embodiment, if the selection operation is not performed after the prescribed time has elapsed since the prescribed operation was executed, controller 105 causes LCD controller 103 to stop the entire illumination on LCDs 101 and 102.

In this case, if user intends only to check the application, illumination on the LCD that the user has checked can be turned off. This allows the power consumption saving.

Next, a third exemplary embodiment will be described.

In this exemplary embodiment, a terminal device capable of switching between validity and invalidity of an operation on touch panels 106 and 107 is described.

Figure 6:
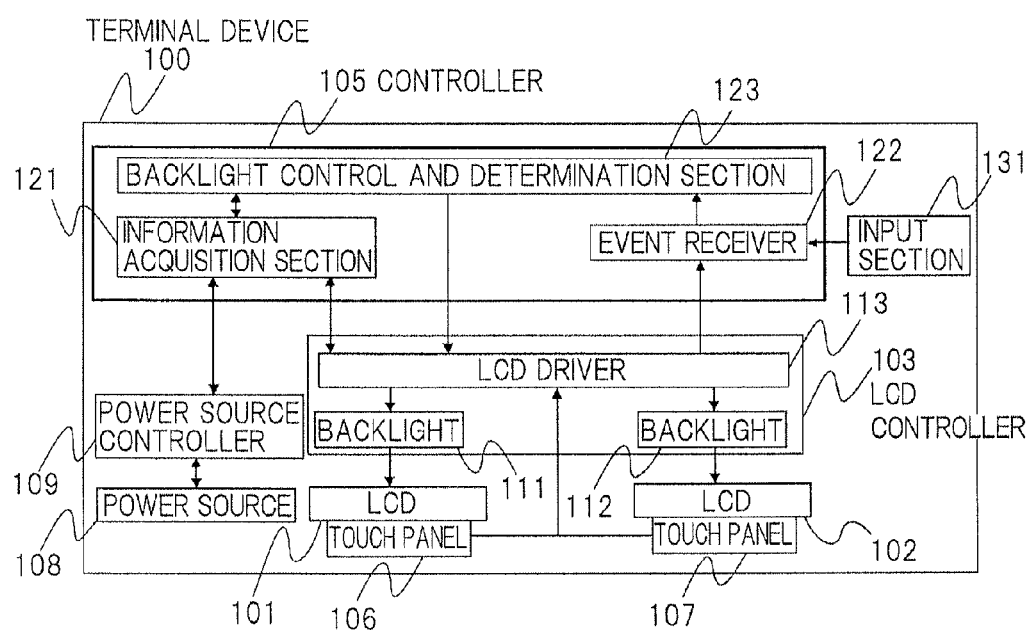
FIG. 6 is a block diagram showing a configuration of a terminal device of a third exemplary embodiment of the present invention.

FIG. 6 is a block diagram showing a configuration of the terminal device of this exemplary embodiment. In FIG. 6, terminal device 100 further includes input section 131 in addition to the configuration shown in FIG. 3.

Input section 131 is included in operation section 104 shown in FIG. 1. Input section 131 is operation means, such as a button and operation keys, that is other than the touch panel. When input section 131 receives a validity instruction for enabling an operation on touch panels 106 and 107 from a user, this section outputs the validity instruction to backlight control and determination section 123 via event receiver 122.

Backlight control and determination section 123 switches between invalidity and validity of an operation on touch panels 106 and 107, on the basis of the state information acquired by information acquisition section 121.

For instance, if the state information indicates that all LCDs 101 and 102 are in the turned off state, backlight control and determination section 123 disables operations on all touch panels 106 and 107. If the state information indicates that at least one of LCDs 101 and 102 is illuminated, this section enables operations on all touch panels 106 and 107.

Accordingly, when LCD controller 103 maintains the illumination in LCDs 101 and 102 in the off-sate, controller 105 disables operations on touch panels 106 and 107. If LCD controller 103 illuminates one or more LCDs from among LCD 101 or 102, this controller enables operations on touch panels 106 and 107.

If the state information indicates that all LCDs 101 and 102 have been in the turned off state for at least a prescribed time, backlight control and determination section 123 may disable operations on touch panels 106 and 107.

If the state information indicates the illumination state where LCDs 101 or 102 is in the turned off state, controller 105 may disable touch panel 106 or 107. For instance, if the state information indicates the illumination state where LCD 101 or 102 is in the turned off state, controller 105 may disable only the touch panel included in the LCD that is in the turned off state.

When event receiver 122 receives the validity instruction, controller 105 enables operations on touch panels 106 and 107. For instance, if operations on touch panels 106 and 107 are invalid, reception of the validity instruction by input section 131 causes controller 105 to enable operations on touch panels 106 and 107. At this time, controller 105 may illuminate LCDs 101 and 102 at the first brightness levels. In this case, an operation of inputting the validity instruction into input section 131 also serves as the first prescribed operation.

According to this exemplary embodiment, when LCD controller 103 maintains the entire illumination in LCDs 101 and 102 in the off-sate, controller 105 disables operations on all touch panels 106 and 107. When LCD controller 103 illuminates at least one of LCDs 101 and 102, this controller enables operations on all touch panels 106 and 107.

In this case, if the entire illumination on LCDs 101 and 102 is turned off, operations on all touch panels 106 and 107 are disabled. If one or more LCDs from among LCD 101 and 102 is illuminated, operations on touch panels 106 and 107 are disabled.

Accordingly, when the terminal device is not used, operations on all touch panels 106 and 107 can be disabled. This allows erroneous operations on touch panels 106 and 107 to be suppressed.

Furthermore, when the terminal device is used, operations even on the touch panel that is not illumination can be enabled. Accordingly, the user can perform the prescribed operation and the selection operation even on the touch panel that is not illumination. This allows the convenience of the user to be improved.

In each of the aforementioned exemplary embodiments, the configuration shown in the drawings is only an example. The present invention is not limited to the configuration.

For instance, the second prescribed operation may be a single-click operation, and the selection operation may be a double-click operation. In this case, when a double-click is performed on the touch panel included in the LCD in the half lit state, this LCD is illuminated at the second brightness levels. Here, when a single-click operation is performed on the touch panel included in the LCD in the half lit state, the illumination on this LCD may be turned off. In this case, there is no first prescribed operation.

This application claims priority rights based on Japanese Patent Application No. 2010-033583, filed on Feb. 18, 2010, the disclosure of which is herein incorporated by reference in its entirety.

What is claimed is:

1. A terminal device, comprising:
a plurality of displays;
an illumination section that is capable of separately illuminating each display of said plurality of displays;
a plurality of operation sections each of the plurality of operation sections respectively corresponding to a display of said plurality of displays; and
a controller that, when a prescribed operation is performed on an operation section of a first display, causes said illumination section to illuminate the first display at a first brightness level that is brighter than an off-state brightness level, and, when a selection operation of selecting any one of said plurality of displays is subsequently performed on any of said plurality of operation sections while said first display selected by the selection operation is illuminated at the first brightness level, causes said illumination section to illuminate said display selected by the selection operation at a second brightness level that is brighter than the first brightness level.

2. The terminal device according to claim 1,
wherein, when a first prescribed operation of selecting all said plurality of displays is performed as the prescribed operation, said controller causes said illumination section to illuminate all said displays at the first brightness level.

3. The terminal device according to claim 1,
wherein, when a second prescribed operation of selecting at least one of said plurality of displays is performed as the prescribed operation, said controller causes said illumination section to illuminate said display selected by the second prescribed operation at the first brightness level.

4. The terminal device according to claim 1, wherein the prescribed operation is one or more operations from among of a single-click
operations, a double-click operations, a short press operations and a long press operations.

5. The terminal device according to claim 1,
wherein, when illumination on said display selected by the selection operation is turned off, said controller causes said illumination section to illuminate said display selected by the selection operation at the first brightness level.

6. The terminal device according to claim 5,
wherein, when illumination of any display, other than the display selected by the selection operation, is turned on, said controller causes said illumination section to stop illuminating said display selected by the selection operation.

7. The terminal device according to claim 1,
wherein, when illumination on said display selected by the selection operation is turned off, said controller causes said illumination section to illuminate said display at the second brightness level.

8. The terminal device according to claim 1, further comprising:
a power source that is capable of accumulating an amount of power for operating said terminal device; and
a power source controller that measures remaining power accumulated in said power source,
wherein, when the prescribed operation is performed, if the remaining an amount of power measured by said power source controller is less than a predetermined threshold, said controller causes said illumination section to illuminate at least one of said plurality of displays at the first brightness level, and, when the remaining an amount of power is not less than the threshold, said controller causes said illumination section to illuminate at least one of said plurality of displays at the second brightness level.

9. The terminal device according to claim 1, wherein, if the selection operation is not performed after a prescribed time has elapsed since the prescribed operation was executed, said controller causes said illumination section to stop entire illumination on said displays.

10. The terminal device according to claim 1, wherein said operation section includes a plurality of touch panels provided in said plurality of displays.

11. The terminal device according to claim 10,
wherein, while said illumination section maintains the entire illumination on said displays in the off state, said controller disable all operations from being performed on all said touch panels, and, when said illumination section illuminates at least one of said plurality of displays, said panel enables all operation to be performed on said touch panel.

12. An illumination control method of a terminal device comprising a plurality of displays, an illumination section that is capable of separately illuminating said displays, and a plurality of operation sections respectively corresponding to each of the plurality of displays, the method comprising:
causing said illumination section to illuminate at least a first display of said plurality of displays at a first brightness level, that is brighter than an off-state brightness level, when a prescribed operation is performed on an operation section corresponding to the first display; and causing said illumination section to illuminate a second display of the plurality of displays, selected by a selection operation of selecting the second display from any of said plurality of displays, at a second brightness level that is brighter than the first brightness level, when the selection operation is performed on said operation section corresponding to the second display while said first display is illuminated at the first brightness level.

* * * * *